April 2, 1957 R. A. REHBERG 2,787,373
SECTIONAL LEAD WIRE TRANSFER AND SORTING DEVICE
Filed Sept. 27, 1955 2 Sheets-Sheet 2
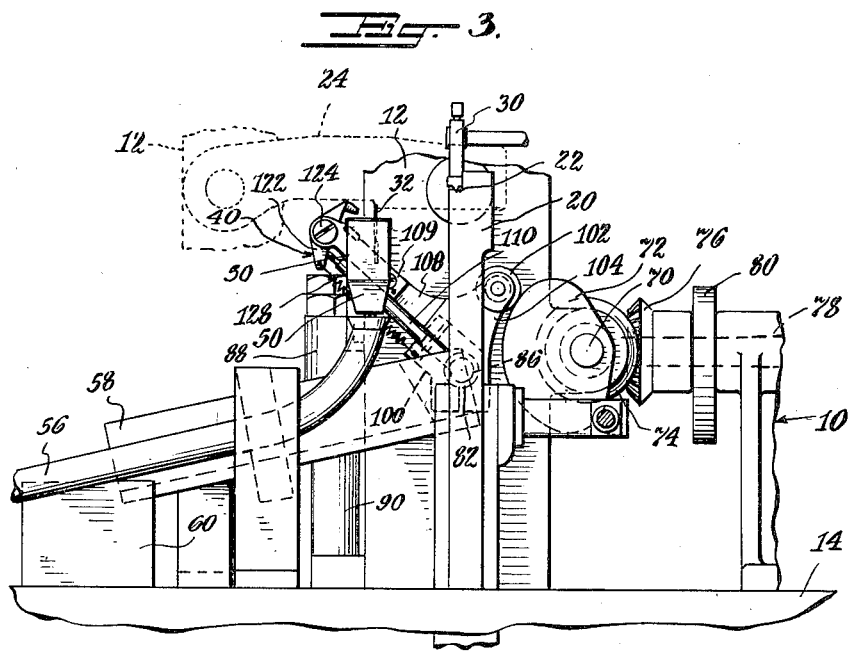
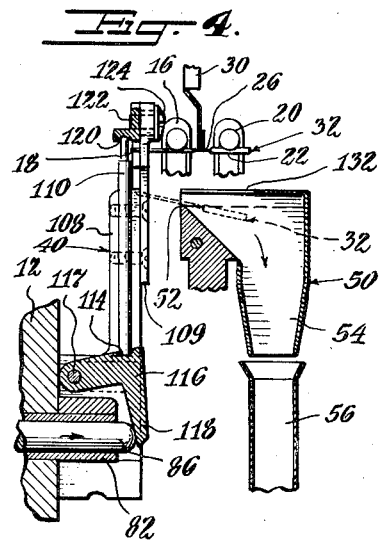
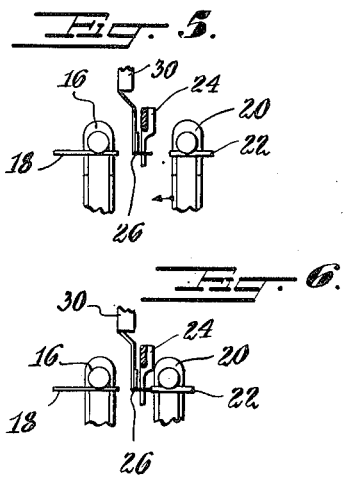
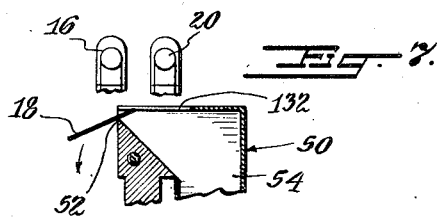
INVENTOR.
R. A. REHBERG
BY
ATTORNEY United States Patent Office 2,787,373
Patented Apr. 2, 1957

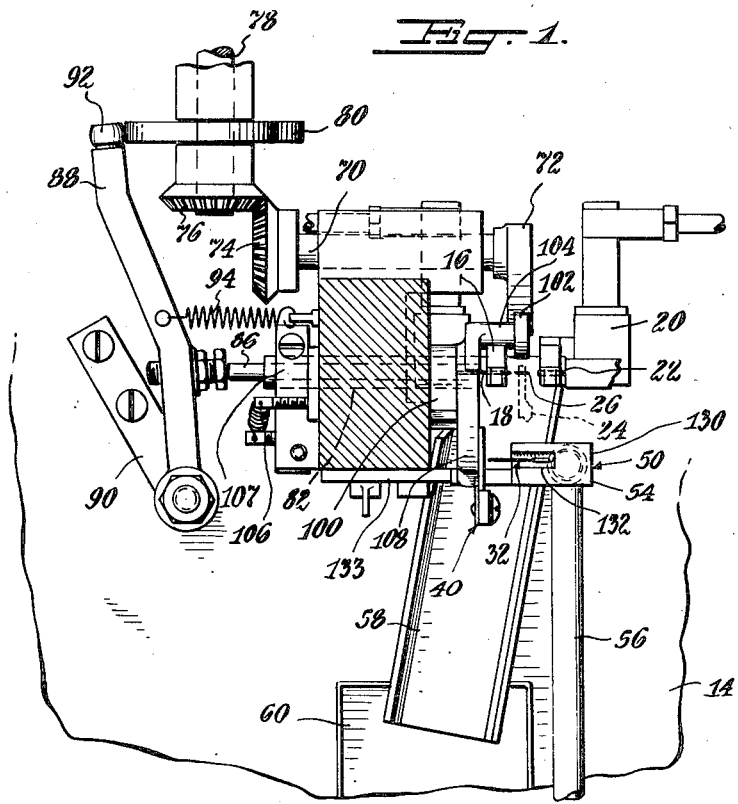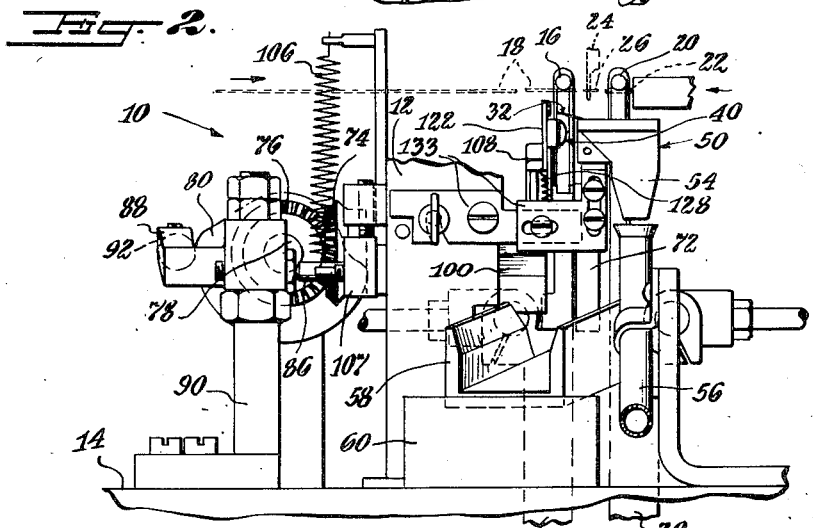

2,787,373

SECTIONAL LEAD WIRE TRANSFER AND SORTING DEVICE

Richard A. Rehberg, Livingston, N. J., assignor to Westinghouse Electric Corporation, East Pittsburgh, Pa., a corporation of Pennsylvania Application September 27, 1955, Serial No. 536,816

3 Claims. (Cl. 209—72)

The present invention relates to a sectional lead wire ejector assembly or a transfer and sorting device for a sectional lead wire welding machine.

In the manufacture of sectional lead wires for incandescent lamps and the like and comprising three or more sections or lengths of wire, the end sections of the leading-in wires may comprise a relatively heavy nickel filament supporting wire and a relatively light copper base connecting wire. Machines for manufacturing such sectional leading-in wires feed the nickel wire and the copper wire from the opposite ends of the machine. The middle dumet sealing section of the leading-in wire is severed from a wire fed into the machine from above and in front of the mechanism for feeding the copper wire and is transferred to a position between the secured copper wire and the nickel wire. Dumet is a composite wire consisting of a core of nickel-iron coated on the exterior with copper, said copper coating being bonded to the core by means of a soldering material (brass) as explained in the Fink Patent No. 1,498,908, dated June 24, 1924. The dumet middle portion is first welded to the nickel and then welded to the copper wire. On the prior art machines, the welded three-piece lead wire was then dropped by gravity into a suitable chute for inspection and sorting by an operator.

Hence, it has been found advantageous according to the invention to provide an automatic sectional lead wire ejector assembly which will automatically pick up the lead wire at the lighter end and transfer the welded three-piece lead wire from the welding or assembly position to a sorting position above a weighing bridge sorting device of the invention. As the welding of the three-piece lead wire is completed, the transfer arm jaw of the transfer device closes around the lighter end (i. e. the copper outer base connecting portion) and swings the lead wire to a position adjacent a weighing bridge portion of the sorting device. If the required two welds have been made the heavier nickel portion of the three-piece lead wire will cause the good lead to drop to the right of the weighing bridge and into a chute for guiding into the packing positions. If only one weld or if no welds have been made the incomplete lead will drop to the left of the weighing bridge (outside the sorting device) for discharge into a shrinkage chute associated thereon.

In its general aspect the present invention has as its objective an automatic sectional lead wire ejector assembly for automatically transferring a welded sectional lead wire from the welding position to a sorting position adjacent a weighing bridge of a lead wire sorting device.

Other objects of the invention will become apparent to those skilled in the art to which it appertains as the description proceeds both by direct recitation thereof and implication from the context.

Referring now to the drawings in which like numerals of reference indicate similar parts throughout the several views:

Fig. 1 is a plan elevational view of a portion of a sectional lead wire welding machine wherein the lead wire ejector assembly (or sectional lead wire transfer and sorting device) of the invention is incorporated.

Fig. 2 is a front elevational view of the lead wire ejector assembly of Fig. 1.

Fig. 3 is a right hand end elevational view of the lead wire ejector assembly of Fig. 1.

Fig. 4 is a vertical sectional view of the lead wire ejector assembly of the invention of Fig. 1 and showing the transfer device thereof (in the lead wire pick-up position) and its associated sorting device.

Fig. 5 is a fragmentary side elevational view of the copper wire holding device, dumet wire holding device, upper welding contact and nickel wire holding device in the aligned longitudinally axial position preparatory to flash butt welding.

Fig. 6 is a view similar to Fig. 5 showing the movement of the nickel wire holder assembly to the left to weld the dumet and nickel wires.

Fig. 7 is a fragmentary view similar to Fig. 4 and showing the discharge of a defective lead wire from the weighing bridge of the sorting device of the sectional lead wire ejector assembly.

Referring now to the drawings and particularly to Figs. 1, 2 and 3, the reference numeral 10 designates a sectional lead wire welding machine, as disclosed for example in Bumpstead Patent No. 2,034,560. This machine 10 may have a copper lead wire feeding mechanism mount bracket 12 which serves as the mounting and supporting means for the lead wire ejector assembly of the invention and is secured as by bolts, on a table 14. This mounting bracket 12 carries a copper wire feeding mechanism 16 (only the holding jaws of which are shown in Figs. 1 through 7) for feeding and severing a copper wire 18 and then aligning and moving the copper wire 18 into welding position with a dumet wire 26. The copper wire feeding mechanism 16 is disclosed in greater detail in Fagen et al. Patent No. 1,213,852. A similar nickel wire feeding mechanism 20 (only the holding jaws of which are illustrated in the drawings) is mounted adjacent the bracket 12 on a nickel wire mechanism mounting bracket (not shown). This nickel wire feeding mechanism 20 also feeds and severs a nickel wire 22, aligns the nickel wire 22 with the longitudinal axis of the copper wire 18, and then moves the nickel wire 22 into welding position with the dumet wire 26. A dumet wire feeding mechanism 24, only the holding jaws of which are shown in Figs. 5 and 6, is likewise carried by a mounting bracket (not shown) upstanding from the table 14. This feeding device 24 for the dumet wire 22, is located above and in front of the copper wire feeding mechanism 16 and the nickel wire feeding mechanism 20. The dumet feeding device 24 (when viewed in Fig. 3) may be said to be at 12 o'clock with respect to the 3 o'clock position of the copper wire feeding mechanism 20. A top welding contact arm 30 (Figs. 4, 5 and 6) is oscillatably mounted by means not shown, on a contact block mounting casting (not shown) in the rear of the copper wire feeding mechanism mounting bracket 12. The oscillating means for the arm 30 and the mounting casting are more fully shown in the Bumpstead Patent No. 2,034,560.

*General operation*

At the start of each sectional wire welding cycle both the copper wire feeding mechanism 16 and the nickel wire feeding mechanism 20, feed the desired length of the copper wire 18 and nickel wire 22 respectively and align the wires 18 and 22 longitudinally in spaced relationship. Simultaneously there after the dumet lead wire transfer device 24 and the upper welding contact 30 oscillate toward the positioned copper wire 18 and nickel wire 22 to deliver a dumet wire 26 in longitudinal alignment with the copper wire 18, and the nickel wire 22, as shown in Fig. 5. The nickel wire feeding mechanism 20 is then reciprocated to the left (when viewed in Fig. 6) by means (not shown) until the nickel wire 22 contacts the dumet wire 26 and is butt welded thereto.

Immediately thereafter, the copper wire feeding mechanism 16 moves to the right (when viewed in Fig. 6) until the copper wire 18 engages the dumet wire 26 and is welded thereto to form a sectional lead wire 32.

Thereupon a lead wire transfer device 40 of the invention moves toward the back of the machine 10 (i. e. toward mounting bracket 12 (Fig. 3) and its jaws close about the relatively lighter (copper lead wire) end 18 of the now welded lead wire 32. The wire holding jaws of both the copper wire feeding mechanism 16 and the nickel wire feeding mechanism 20 now open, leaving the sectional lead wire 32 held by the transfer mechanism 40. The welded lead wire transfer mechanism 40, the dumet lead wire transfer arm of the dumet lead wire feeding mechanism 24 and the welding contact arm 30 swing away from the copper wire feeding mechanism 16 and the nickel wire feeding mechanism 20. The welded lead wire transfer mechanism 40 positions the lead wire 32 contiguous to a sorting device 50 of the lead wire ejector of the invention.

This sorting device 50 is an open ended "fare box" slipped over and pinned to a weighing bridge 52 provided with a knife edge upon which a complete lead wire 32 is unbalanced inwardly. If the lead wire 32 is complete (i. e. the two welds have been made) the free or heavier nickel end 22 of the welded sectional wire 32 will cause the lead wire 32 to fall (when the transfer device 40 releases the lead 32) into a sorting chute 54 for delivery (nickel end first) through a funnel 56 (Fig. 4) to a vibratory packaging device (not shown). If the lead wire 32 is incomplete, it will fall to the left of the weighing bridge 52 (Fig. 7) upon release by the transfer device 40 and into a shringage chute 58 for delivery to a shrinkage box 60 (Fig. 1).

Transfer device oscillating mechanism

The mounting and supporting casting 12 carries a cam shaft 70 of the transfer device oscillating mechanism (Figs. 1 and 3) journalled therein and extending therethrough. This shaft 70 carries a transfer device oscillating cam 72 on its right hand end (when viewed in Fig. 1). The left hand end (when viewed in Fig. 1) of the shaft 70 carries a bevelled gear 74 in engagement with another bevelled gear 76 on a combination drive and cam shaft 78 extending suitably transverse to the shaft 70. This shaft 78 is connected to a suitable source of direct power such as a motor (not shown) and carries a jaw opening cam 80 of the transfer device jaw operating mechanism.

Transfer device jaw operating mechanism

A hollow transfer device shaft or spindle of the transfer device jaw operating mechanism is suitably journalled in the forward portions of the casting 12, substantially parallel to the oscillating mechanism cam shaft 70. This spindle 82 carries mounted on the right hand end thereof (when viewed in Figs. 1 and 2), the transfer device 40. A jaw opening plunger 86 reciprocates within the hollow shaft 82 and is connected to the transfer device 40 as hereinafter explained. The left hand end when viewed in Fig. 1, of the plunger 86 is in adjustable contact with a spring-biased plunger operating lever 88 pivotably mounted on a lever mounting bracket 90 upstanding from the table 14. This lever 88 carries a cam roller 92 in engagement with the jaw opening cam 80 on the drive shaft 78. A lever biasing spring 94 extends between suitable pin on the lever 88 and a pin projecting from the casting 12.

Transfer device

As shown particularly in Figs. 1, 2, 3 and 4, the transfer device 40 has a generally Y-shaped bell crank lever 100, which as hereinbefore mentioned is carried, on the right hand end (when viewed in Fig. 1) of the spindle 82. The lever 100 carries an oscillating cam contact roller 102 on its relative shorter end 104 (Fig. 3) for engagement with the oscillating cam 72. A spring 106 extends from an arm 107 on the left hand end (when viewed in Fig. 1) of the spindle 82 to the casting 12 and holds the roller 102 in contact with the cam 72. A relatively longer arm 108 of the lever 100, carries a lead wire engaging jaw mounting means 109. The bottom portion of a lead wire jaw operating rod 110 engages a suitable socket 114 in the upper surface of Fig. 4 of a dog 116 pivoted within a slot in the lever 100 at 117. A lower arm 118 of the dog 116 is in engagement with the right hand end (when viewed in Fig. 4) of the plunger 86. The upper end of the operating rod 110 engages a socket 120 in the underside of a movable lead wire jaw 122 suitably pivoted on the upper end of mounting means 109 as at 124 (Fig. 3). The upper end of the mounting means 109 forms the stationary jaw of the transfer device 40 (Fig. 3). A spring 128 (Fig. 3) extending from the movable jaw 122 to the bottom portions of the lever 100 maintains the operating rod 110 in contact with the movable lead wire holding jaw 122 and the dog 116 and the lead wire jaws in the normally open position.

Operation of the transfer device

After the weld (Fig. 6) of the copper wire 18 to the dumet wire 26 has been made, a reduced portion of the oscillating cam 72 (Fig. 3) moves the now open movable jaw 122 (on the end of the mounting means 109 of the transfer device lever 100) clockwise about 45° from the position shown in Fig. 3, until the movable jaw 122 encircles the relatively lighter copper end 18 of the sectional lead wire 32. Immediately thereafter the cam roller 92 on the end of the plunger operating lever 88 engages a reduced portion of the jaw operating cam 80 moving the lever 88 in a clockwise direction and hence the operating plunger 86 to the right (when viewed in Figs. 1 and 4). Movement to the right of the plunger 86 causes the dog 116 to move counter-clockwise and the operating rod 110 on the lever arm 108 to move upwardly to close the jaw 122 about the relatively lighter copper end 18 of the lead wire 32.

Immediately thereafter the roller 102 on the transfer device lever arm 104 engages a raised portion of the oscillating cam 72 and the transfer device 40 retracts or oscillates in a counterclockwise direction to the position shown in Fig. 3 contiguous to the sorting device 50 of the lead wire ejector assembly of the invention. It will be understood of course that prior to the retraction of the transfer device 40 that the holding jaws of the copper wire feeding mechanism 16, the nickel wire feeding mechanism 20 and the dumet feeding mechanism 24 have opened.

Sorting device 50

The sorting device 50 of the lead wire ejector assembly is provided with a cover 130 (Figs. 1 and 4), suitably slotted as at 132 (Fig. 1), to admit therein the relatively heavier nickel portion 22 of the lead wire 32 and to cause said lead wire 32 to rest upon the bevelled edge or weighing bridge 52 in an inwardly unbalanced condition. It will be understood from a consideration of Fig. 4 that the weighing bridge 52 of the sorting device 50 is vertically and horizontally adjustably mounted on a suitable double mounting bracket or post 133 upstanding from the table 14.

This weighing bridge 52 is adjustably horizontal by means of horizontal slots in bracket 133 (Fig. 2) to unbalance a complete lead wire 32 to the right (when viewed in dotted lines in Fig. 4) and unbalance an incomplete lead to the left (when viewed in Fig. 7). This bridge 52 is vertically adjustable through vertical slots in the upstanding portion of the bracket 133 to place the bevelled edge of the bridge 52 just slightly below the release position of the jaws 122.

As hereinbefore mentioned when the transfer device 40 of the lead wire ejector assembly of the invention returns with a complete sectional lead wire 32 to the position shown in Fig. 3, the lead wire 32 is aligned with the slot 132 in the cover plate 130 of the sorting device 50. When the roller 92 on the plunger operating lever 88 engages a raised portion of the jaw operating cam 80 the plunger 86 is moved to the left (when viewed in Fig. 4); the dog 116 moves clockwise; the operating rod 110 on the transfer device lever arm 108 moves downwardly; and the movable jaw 122 opens. Opening of the jaw 122 causes the heavier nickel end 22 of the lead wire 32 to drop downwardly into the guide chute 54 of the sorting device 50, heavy end first, and into a delivery chute 56 for delivery to a vibratory type packaging device (not shown).

If, for example, the nickel portion 22 (or both the nickel portion 22 and the dumet portion 26), of the sectional lead wire 32 are missing the defective lead wire 32 will be unbalanced outwardly away from the guide chute portion 54 of the sorting device 50. The defective lead 32 will fall to the left (when viewed in Fig. 4) of the weighing bridge 52 into a discharge chute 58 and thence into a shrinkage box 60 (Fig. 1). Further if the parts, (18, 22 and 26) are delivered to the welding position (Fig. 5) but no welds are accomplished the parts 22 and 26 drop into the chute 58 which extends beneath the welding position.

Although a preferred embodiment of the invention has been disclosed it will be understood that modifications may be made.

I claim:

1. A sectional lead wire ejector assembly for a sectional lead wire welding machine comprising mounting means, a transfer device on said mounting means having at least a pair of lead wire engaging jaws and for transporting a finished welded sectional lead from the welding position to a sorting position, means for oscillating said transfer device between the welding position and the sorting position, means for opening and closing said jaws of said transfer device, and a sorting device on said mounting means for accepting satisfactory complete sectional lead wires and ejecting incomplete defective lead wires.

2. A sectional lead wire ejector assembly for a sectional lead wire welding machine comprising mounting means, a transfer device on said mounting means having at least a pair of lead wire engaging jaws and for transporting a finished welded sectional lead from the welding position to a sorting position, means for oscillating said transfer device between the welding position and the sorting position, means for opening and closing said jaws of said transfer device, and a sorting device on said mounting means having at least an open ended box provided with a weighing bridge for accepting satisfactory complete sectional lead wires and ejecting incomplete defective lead wires.

3. A sectional lead wire ejector assembly for a sectional lead wire welding machine comprising mounting means, a transfer device on said mounting means for transporting a finished welded sectional lead from the welding position to a sorting position and comprising a spindle rotatable in said mounting means, a bell crank lever on said spindle and a pair of lead wire engaging jaws on said lever, means for oscillating said transfer device between the welding position and the sorting position, means for opening and closing said jaws of said transfer device, and a sorting device on said mounting means for accepting satisfactory complete sectional lead wires and ejecting incomplete defective lead wires.

References Cited in the file of this patent

UNITED STATES PATENTS

| | | |
|---|---|---|
| 2,623,803 | Gamble | Dec. 30, 1952 |
| 2,717,092 | Gartner et al. | Sept. 6, 1955 |
| 2,736,430 | Ratti | Feb. 28, 1956 |